Nov. 7, 1939.         J. VASTA         2,179,360
CLUTCH MOUNTING
Filed July 13, 1938
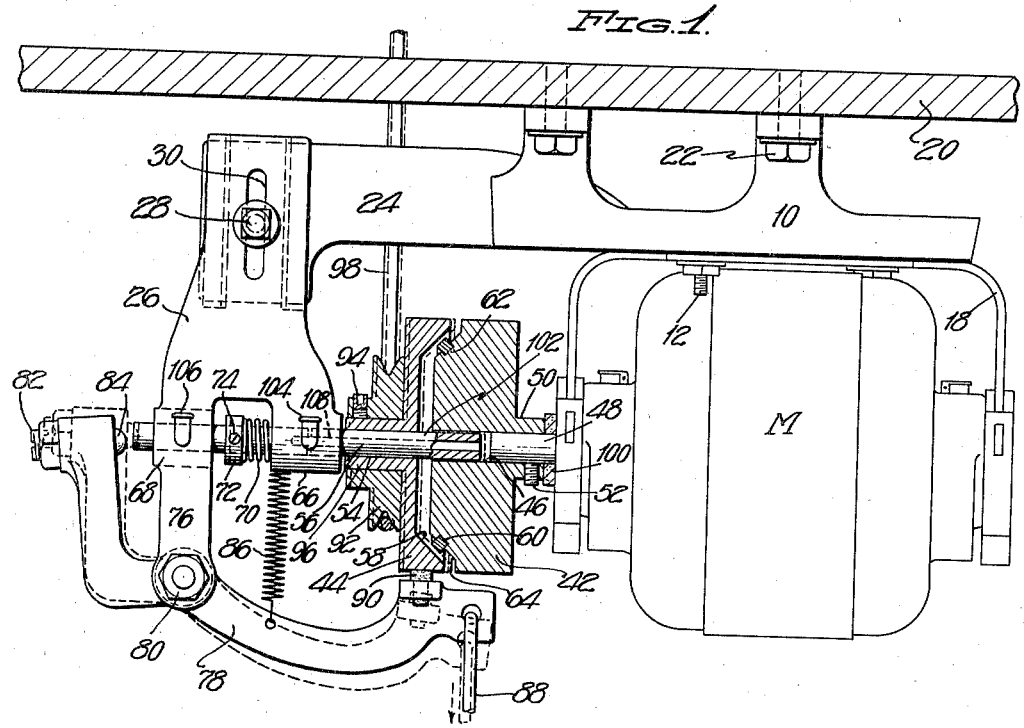
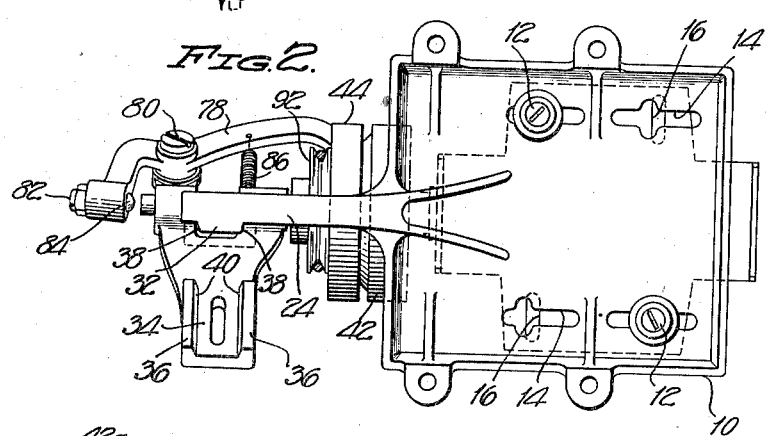
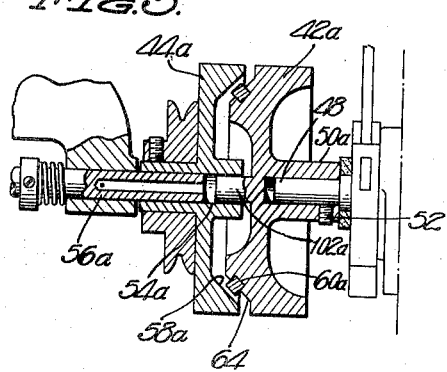
JOSEPH VASTA.
INVENTOR
BY Knight Bros
ATTORNEYS.

Patented Nov. 7, 1939

2,179,360

UNITED STATES PATENT OFFICE 2,179,360

CLUTCH MOUNTING

Joseph Vasta, New York, N. Y.

Application July 13, 1938, Serial No. 219,026

1 Claim. (Cl. 192—110)

This invention relates to clutches and mountings therefor of the type used for driving sewing machines by an electric motor.

One of the principal problems of such a clutch is securing the alignment of the driven member of the clutch and the motor shaft. Faulty alignment causes unsatisfactory operation and excessive wear on all parts of the driving mechanism, including the motor bearings.

To overcome this difficulty motors are now supplied with a special casing of motor and clutch, with interfitting parts accurately machined so that the motor and clutch fit together in alignment. This is a relatively expensive product, as compared with one which can be used with any standard motor.

Other clutches for use with standard motors have means for adjusting the bearings of the driven member into alignment with the motor shaft, but the complexity of the adjustments is such as to make perfect alignment difficult to secure.

In accordance with my invention the alignment is assisted by axial guide devices on the driving and driven members, which serve to align the driven member with respect to the motor shaft while its bearing bracket is being fixed to the motor base.

The accompanying drawing shows two illustrative forms of the invention.

Fig. 1 is a side elevation of a sewing machine clutch and motor, parts of the clutch being shown in section;

Fig. 2 is a plan view of the unit shown in Fig. 1, with the bearing bracket of the driven member in the position in which it is placed to slip the clutch parts together; and Fig. 3 is a detail longitudinal sectional view of a modified form of clutch.

Figs. 1 and 2 show a motor base 10 to which a motor M is attached by bolts 12 passing through slots 14 in the motor base 10 and slots 16 in the cradle 18 of the motor. The base 10 is attached to the cloth board 20 of the sewing machine by screws 22.

The base 10 has an arm 24 to which a bearing bracket 26 is attached by a bolt 28. The bolt passes through a slot 30 in the bearing bracket and is screwed into a threaded hole in the arm 24. A tongue 32 on the arm 24 fits into a groove 34 between two ribs 36 of the bracket arm 26. The sides 38 of the tongue 32 and the sides 40 of the ribs 36 are bevelled to make a firm fit of the bearing bracket to the arm 24. The bevelled faces 38 and 40, when clamped together by the bolt 28, oppose movement of the bearing bracket with respect to the arm 24 in every direction except one perpendicular to the motor shaft.

The clutch comprises two friction members 42 and 44. The member 42 has an axial bore 46 which snugly fits the protruding end 48 of the motor shaft. A hub 50 on the member 42 is bored to receive a setscrew 52 which serves to secure it to the shaft 48.

The clutch member 44 has an axial bore 54 into which a shaft 56 is driven so that these parts become a solid unit. The member 44 has a conical friction face 58 which coacts with a friction band 60, preferably in the form of a square leather strap, which is partially laid into a groove 62 in the conical face 64 of the clutch member 42. The bearing bracket has bearings 66 and 68 to receive the shaft 56. Preferably a compression spring 70 is inserted between the bearing 66 and a collar 72 fixed by a setscrew 74 to the shaft 56, to hold the shaft normally to the left, so that its friction face 58 is out of contact with the friction band 60. The bearing 68 has an arm 76 on which a lever 78 is rockably mounted by a screw 80. The lever 78 has a setscrew 82 screwed into its left-hand arm, where its end 84 stands in opposition to the end of shaft 56. A spring 86 normally pulls the lever away from the shaft 56 and a link 88 extends to a pedal (not shown) by which the lever can be operated to thrust the driven member comprising the shaft 56 and disk 44 against the clutch member 42. A brake shoe 90 may be provided on the lever 78 to stop the disk 44 when it moves out of engagement with the clutch member 42. A belt pulley 92 is fixed by a screw 94 to a hub 96 of disk 44. A belt 98 runs from this pulley up to a pulley on the main shaft of the sewing machine (not shown) in the usual manner. A fiber washer 100 may be provided to take the thrust of the clutch, this washer being inserted between the face of the adjacent end bearing of the motor shaft and the hub 50 of the clutch member 42.

In accordance with the present invention the alignment of the driven member comprising the shaft 56 and disk 44 with the motor shaft 48 is reduced to the utmost simplicity by extending the shaft 56 at 102 into the bore 46 of the clutch member 42, which is made somewhat longer than the protruding end of shaft 48, to form a socket. When mounting the driven member, the bearing bracket 26 is first positioned as shown in Fig. 2 while the protruding end 102 of shaft 56 is slipped into the socket formed by that part of the bore 46 not occupied by the shaft 48. This automatically determines the correct position of the driven member with respect to the clutch member 42 and this position is retained by throwing the bearing bracket 26 over into contact with the arm 24 and clamping the parts together by the bolt 28. As the bolt is tightened up the clutch member 42 can be spun by hand to assure freedom of movement between the two parts of the clutch. The fit between the end 102 of shaft 56 and the bore 46 can be quite free without impairing the effectiveness of these guiding parts in aligning the driven member with the friction member 42. That is to say, there may be considerably greater play between these parts than could be allowed if they were to serve as bearing surfaces. Since they serve only as an aligning means and the bearing bracket fixed to the base plate thereupon takes up the function of holding the driven member in alignment with the motor shaft, a bearing fit of the shaft end 102 in the bore 46 is not required. The tongue and groove faces on the bearing bracket and the arm 24 prevent relative movement of the bearing bracket and the arm 24 in all directions, but one perpendicular to the motor shaft, which is the direction required for adjustment to different sizes of motor. Extreme accuracy in machining of the bevel faces 38 and 40 is not required, inasmuch as the position of the motor cradle 18 upon the base 10 can be adjusted if necessary to meet a slight discrepancy in alignment in the horizontal plane. The simplest way to do this is to allow the motor to run for a short time with with the bolts 12 loosened, so that it can settle naturally into the correct position. It is necessary to have the faces 38 and 40 exactly perpendicular to horizontal planes containing the axes of the motor shaft 48 and driven shaft 56, respectively.

Oil cups 104 and 106 are provided for oiling the respective bearings 66 and 68. A central bore 108 in shaft 56 carries oil to the bore 46.

Fig. 3 shows a reversal of the arrangement shown in Fig. 1. The motor and bearing bracket and base plate are the same for this modification, the only difference being in the clutch members. The friction member 42a is fixed to the motor shaft 48 by a setscrew 52 passing through its hub 50a. The driven member comprises a disk 44a driven upon a shaft 56a and having a conical bearing face 58a. The clutch member 42a has a conical face 64 bearing a friction band 60a. In this case the bore 54a of the disk 44a is somewhat longer than the protruding portion of the shaft 56a, to provide a socket receiving a shaft 102a extending axially from the member 42a. In other respects the devices are similar, that of Fig. 1 being preferred because it is simpler to manufacture.

I claim:

In a device of the class described, a motor, a base upon which said motor is mounted, a driving member comprising the shaft of said motor and a friction element fixed to said shaft, a driven member comprising a shaft and a friction element fixed thereto and adapted to bear against the friction element of said driving member, a bearing bracket in which the shaft of said driven member is rotatably mounted, means for detachably securing said bearing bracket to said base, said last means being adjustable in a direction perpendicular to the axis of the shaft of said driven member, one of said members having an axial socket, the other of said members having an axially protruding shaft adapted to slide into said socket to align said members when said bearing bracket is mounted on said base.

JOSEPH VASTA.